United States Patent [19]
Turner

[11] 3,806,587
[45] Apr. 23, 1974

[54] APPARATUS FOR FORMING ORIENTED CONTAINERS

[75] Inventor: Howard M. Turner, Oak Forest, Ill.

[73] Assignee: Continental Can Company, Inc., New York, N.Y.

[22] Filed: Dec. 31, 1969

[21] Appl. No.: 889,362

[52] U.S. Cl............... 425/387 B, 425/DIG. 206, 425/DIG. 212, 425/DIG. 216, 425/DIG. 233

[51] Int. Cl............................................ B29d 23/03

[58] Field of Search................. 18/5 B, 14 A, 1 FS; 425/DIG. 216, DIG. 212, DIG. 206, DIG. 233, 326 B, 387 B

[56] References Cited
UNITED STATES PATENTS

| | | | |
|---|---|---|---|
| 3,294,885 | 12/1966 | Cines et al. | 264/99 |
| 2,919,462 | 1/1960 | Friden | 18/5 BM UX |
| 3,288,317 | 11/1966 | Wiley | 18/14 A X |
| 3,233,416 | 2/1966 | Rainwater et al. | 18/5 BC UX |
| 3,380,122 | 4/1968 | Kirk | 18/1 FS UX |

FOREIGN PATENTS OR APPLICATIONS

| | | | |
|---|---|---|---|
| 397,223 | 2/1966 | Switzerland | 18/5 BZ |

Primary Examiner—Richard B. Lazarus
Attorney, Agent, or Firm—Diller, Brown, Ramik and Wight

[57] ABSTRACT

This disclosure relates to an apparatus for producing molecularly oriented polymeric containers including a pair of mold bodies which in a closed position thereof define a cavity contoured to a desired container configuration, means for opening and closing the mold bodies, means for extruding a parison between the mold bodies when the latter are in the open position thereof, means for pinching closed axially spaced points of the parison during the closing of the mold bodies to form a closed parison portion, the pinching means including an insert carried by each of the mold bodies, means for moving the inserts to axially stretch the pinched parison portion, and means for inflating the pinched parison portion to form a container.

5 Claims, 4 Drawing Figures

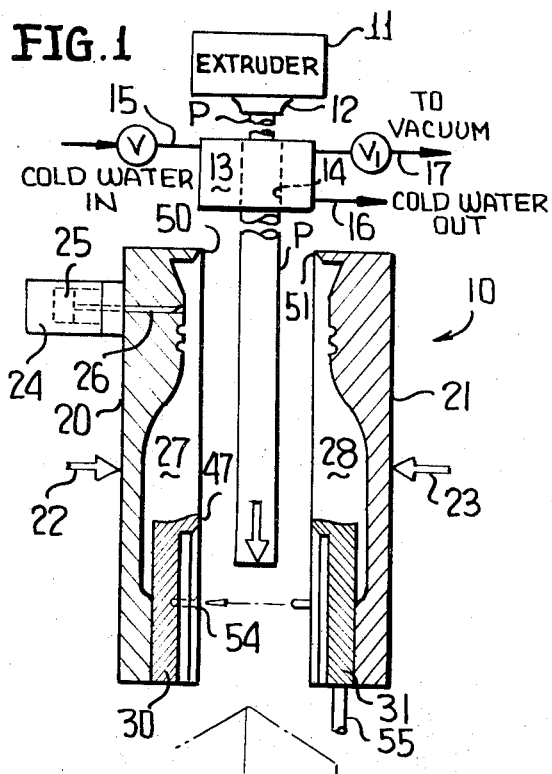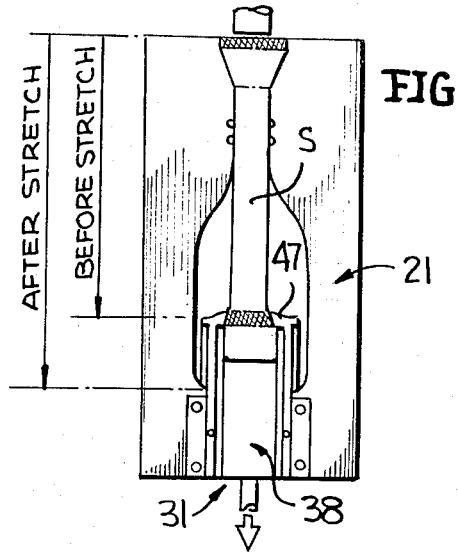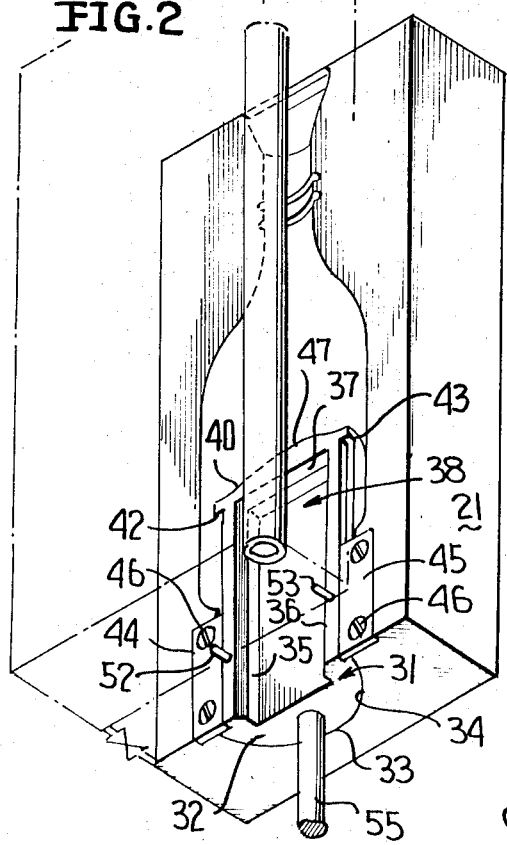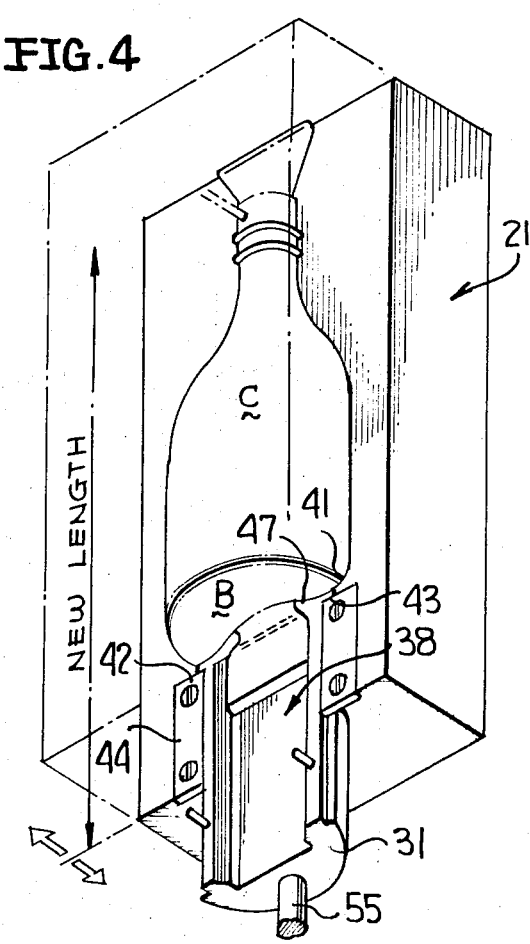
FIG. 1
FIG. 2
FIG. 3
FIG. 4
INVENTOR
HAROLD M. TURNER
ATTORNEYS

— 3,806,587 —

APPARATUS FOR FORMING ORIENTED CONTAINERS

A primary object of this invention is to provide a novel apparatus for producing a molecularly oriented container or similar article from an extruded parison of polymeric or copolymeric material by stretching a pinched portion of the parison while the latter is in a closed mold prior to or during the inflation of the pinched parison portion. To further enhance the physical properties of the container, the parison, prior to being pinched in the manner aforesaid, is passed through a chilling unit upstream of the mold to reduce the parison temperature to the optimum for obtaining the molecular orientation desired. Preferably, this is accomplished by passing the parison through an annular housing having a cooling chamber as well as numerous ports in fluid communication with a source of vacuum for drawing the exterior surface of the parison into contact with the chilled surface of the chilling unit. Thus, in accordance with the present invention the apparatus not only provides axial orientation during the stretching of the pinched portion in the mold, but the vacuum acting upon the parison prior to the pinching thereof causes an increase in the circumference of the parison thereby producing both circumferential and axial molecular orientation and the subsequent molding of a biaxially oriented container.

A further object of this invention is to provide each of a pair of mold bodies defining a cavity with an insert, the inserts being cooperative to define a recess for receiving material of the parison squeezed thereinto during the closing of the mold bodies.

Still another object of this invention is to provide means for at least temporarily connecting together the inserts at least when the mold bodies are in the closed position thereof, whereby movement imparted to one of the inserts to effect the stretching of the parison portion is operative through the connecting means to move the other of the inserts.

Still another object of this invention is to provide a novel apparatus of the type aforesaid wherein the pair of inserts cooperatively define a surface forming a bottom of the container, and means for positively stopping the inserts at a position whereat surfaces of the inserts smoothly merge with surfaces of the mold bodies to collectively define the mold cavity.

With the above and other objects in view that will hereinafter appear, the nature of the invention will be more clearly understood by reference to the following detailed description, the appended claimed subject matter and the several views illustrated in the accompanying drawing.

IN THE DRAWING:

FIG. 1 is a schematic view of the novel apparatus of the present invention, and illustrates a pair of mold bodies in the open position thereof, each provided with a sliding insert, and further illustrates a parison positioned between the closed bodies prior to the closing thereof.

FIG. 2 is a perspective view of one of the mold bodies of FIG. 1, and illustrates the associated insert in its retracted position partially interiorly of the mold body cavity.

FIG. 3 is an elevational view of the mold body of FIG. 2, and illustrates the manner in which a pinched portion of the parison is squeezed into a recess of the insert during the closing of the mold bodies.

FIG. 4 is a perspective view similar to FIG. 2, and illustrates the insert at its fully extended position with the parison now blown to the configuration of the mold cavity.

A novel apparatus for producing molecularly oriented polymeric containers in the manner heretofore briefly described is schematically illustrated in FIG. 1 of the drawing, and is generally designated by the reference numeral 10. The apparatus 10 includes a conventional extruder 11 having a nozzle 12 from the orifice (not shown) of which is extruded a hollow tubular parison P of polymeric or copolymeric material as, for example, polyethylene, polypropylene, etc. The nozzle 12 is of a conventional design and may include an orifice for delivering pressurized air, inert gas or a similar gaseous medium internally of the parison P to control the size thereof.

In addition, the parison P is delivered to and through a chilling unit 13 which is an annular structure provided with a cylindrical bore 14. Though not shown, the chilling unit 13 includes suitable chambers or ports through which fluid, such as water, is communicated from an inlet 15 having a valve V to an outlet 16 which is preferably connected to a drain (not shown). By regulating the valve V, the temperature of the surface 14 can be regulated as desired.

In order that the external surface (unnumbered) of the parison P is brought into contact with the surface of the bore 14, another conduit 17 is connected to a suitable source of vacuum such as a vacuum pump, which is controlled by a valve $V^1$. The surface of the bore 14 is provided with a plurality of minute bores which are in fluid communication with the conduit 17 whereby upon regulating the valve $V^1$ the exterior surface of the parison P is drawn into intimate contact with the surface of the bore 14 as the parison descends downwardly during the continuous extrusion thereof, as is graphically illustrated in FIG. 1. Due to the vacuum and/or internal pressure within the parison P the latter is expanded circumferentially which provides not only accurate sizing of the parison P and temperature control, but transverse or circumferential orientation of the molecules of the material also takes place during the passage of the parison through the chilling unit 13.

The parison P is extruded between a pair of mold bodies 20, 21 which are movable between an open position illustrated in FIG. 1 to a closed position (FIG. 4) by conventional mold body moving means 22, 23. Though not illustrated, the specific details of the machine 10 and particularly the manner in which the mold bodies 20, 21 are moved between the opened and closed position thereof, may be comparable to the structure disclosed in commonly assigned Pat. No. 2,784,452 in the name of Ruekberg et al., issued Mar. 12, 1957. In general, the overall apparatus 10 may include a hub supported for rotation, preferably on a horizontal axis, carrying a plurality of radial positioned arms. Each of the arms would support two of the mold bodies 20, 21 with a cam mechanism as disclosed in the latter-noted patent operative to move the mold bodies 20, 21 away from each other upon rotation of the hub and the several arms carried thereby. Likewise, the extruder 11 may be of a standard construction to supply the plastic material continuously to the molds as the same revolve about the shaft. Furthermore, each of the mold halves 20 is provided with a conventional blow cylinder 24 in which reciprocates a piston 25 carrying a blow needle 26 which is moved from the position illustrated in FIG. 1 to the right thereof to puncture the parison P after the molds have been closed and thereby "blow" each clamped portion or segment to form a container C (FIG. 4).

The mold bodies 20, 21 include a pair of cavities 27, 28 which are contoured to the general configuration of the desired container C. Furthermore, each of the mold bodies 20, 21 includes respective inserts 30, 31 which are moved from the position illustrated in FIG. 2 to the position illustrated in FIG. 4 to axially stretch a pinched off portion of the parison P prior to the inflation thereof by air entering therein from the blow needle 26. Since the inserts 30, 31 are virtually identical the following description of the insert 31 with respect to the mold body 21 will be sufficient for a complete understanding of this invention.

Referring particularly to FIGS. 2 and 4, each insert 31 of the apparatus 10 includes a body 32 provided with a generally semi-cylindrical surface 33 which is slidably received in a like contoured bore 34 of the mold body 21. The insert 31 includes a pair of side walls 35, 36 and an end wall 37 defining therebetween a recess 38. An uppermost surface 40 of the insert 31 is contoured to the general configuration of the eventual bottom B of the container C and is likewise of a generally semi-cylindrical shape as viewed from above. Thus, the surfaces 40 of the inserts 30, 31 define a generally circular bottom B of the container C, it being noted that the surface 40 merges perfectly with a lowermost radius 41 of the cavity 28 when the insert 31 is in its retracted position, as is illustrated in FIG. 4. In order to assure such merger between the surfaces 40, 41, the insert 31 includes a pair of shoulders or stops 42, 43 which contact respective plates 44, 45, as shown in FIG. 4. The plates 44, 45 are fastened by screws 46 or equivalent fastening means to the mold body 21, and additionally function to guide the movement of the insert 31 between the positions shown in FIGS. 2 and 4.

The wall 37 of the insert 31 additionally includes a face 47 which in cooperation with a like face 47 of the insert 30 (FIG. 1) functions to pinch off or close the lowermost portion of the parison P upon the closing of the mold bodies 20, 21. The mold bodies 20, 21 likewise include cooperative pinch-off means 50, 51 (FIG. 1) for closing or pinching-off the uppermost portion of the parison P.

The insert 31 also includes a pair of pins 52, 53 (FIG. 2) which are alignable with respective openings 54 (FIG. 1) in the insert 30. Upon the closing of the mold bodies 20, 21 the pins 52, 53 enter the openings 54 in order that the insert 30, 31 can be moved simultaneously upon the actuation of a rod 55 which is preferably though not necessarily moved by a cam and cam follower (not shown) similar to the structure for opening and closing the mold bodies 22, 23 as is further described in the latter-noted patent.

Referring again to FIG. 1, after the parison P has passed through the chilling unit 13 and has reached a position corresponding to that illustrated in FIG. 1, the means 22, 23 are operative to close the mold bodies 20, 21. During this closing operation, the inserts 30, 31 are in the position illustrated in FIGS. 1, 2 and 3 whereupon the surfaces 50, 51 and 47, 47 pinch off a portion or segment S of the parison P (FIG. 3) with the crosshatching indicating the pinched-off and sealed portions. During this same closing operation of the mold bodies 20, 21 the pins 52, 53 enter the openings 54 and thereafter the rod 55 is drawn downwardly to axially stretch the portion S, which movement of the inserts 30, 31 is limited by the abutment between the shoulders 42, 43 and the plates 44, 45. Depending upon the particular control desired, the blow needle 26 is preferably introduced into the segment S after the same has been fully stretched to the "After Stretch" position of FIG. 3. However, this inflation may take place during the stretching of the parison segment S since the material tends to reform and close the puncture created by the needle 26. Furthermore, by elevating the needle 26 above the position illustrated in FIG. 2, the inflation of the segment S can take place simultaneously with the stretching since much of the material above the threads of the neck (unnumbered) of the container is scrap which is subsequently removed.

It is further particularly noted that during the closing of the mold bodies 20, 21 the hatched portion of the parison P is flattened or squeezed and the recess 38 accommodates this excess material to prevent malfunctioning of the apparatus, as is best illustrated in FIG. 4.

While preferred forms and arrangement of parts have been shown in illustrating the invention, it is to be clearly understood that various changes in details and arrangement of parts may be made without departing from the spirit and scope of this disclosure.

I claim:

1. Apparatus for producing molecularly oriented polymeric container comprising a pair of mold bodies which in a closed position thereof define a cavity contoured to a desired container configuration, means for moving said mold bodies relatively toward and away from each other between respective closed and opened positions thereof, means for extending a parison between said mold bodies when the latter are in the open position thereof, means for pinching closed axially spaced points of said parison during the closing of said mold bodies to form a closed parison portion, said pinching means including an insert carried by each of said mold bodies, means for moving said inserts to axially stretch said pinched parison portion, means for inflating said pinched parison portion, means for temporarily connecting together said inserts only when said mold bodies are in the closed position thereof, said insert moving means being operative only through one of said inserts when connected together to move the other of said inserts operatively through said connecting means, and guide means between each insert and its associated mold body for maintaining only straight line axial guiding of said inserts upon movement thereof by said moving means.

2. The apparatus as defined in claim 1 wherein said inserts include mating portions defining recess means upon the closing of said mold bodies for receiving material of said parisons squeezed thereinto during the closing of said mold bodies.

3. The apparatus as defined in claim 1 including means for circumferentially increasing the size of said parison prior to the operation of said pinching means whereby the molecular chains of the polymeric material are oriented biaxially prior to the inflation of said parison portion.

4. The apparatus as defined in claim 3 including means for positively stopping said insert moving means at a position whereat surfaces of said inserts smoothly merge with said surfaces of said mold bodies to collectively define said cavity.

5. The apparatus as defined in claim 1 including means for positively stopping said insert moving means at a position whereat surfaces of said inserts smoothly merge with surfaces of said mold bodies to collectively define said cavity.

* * * * *